Patented May 29, 1923.

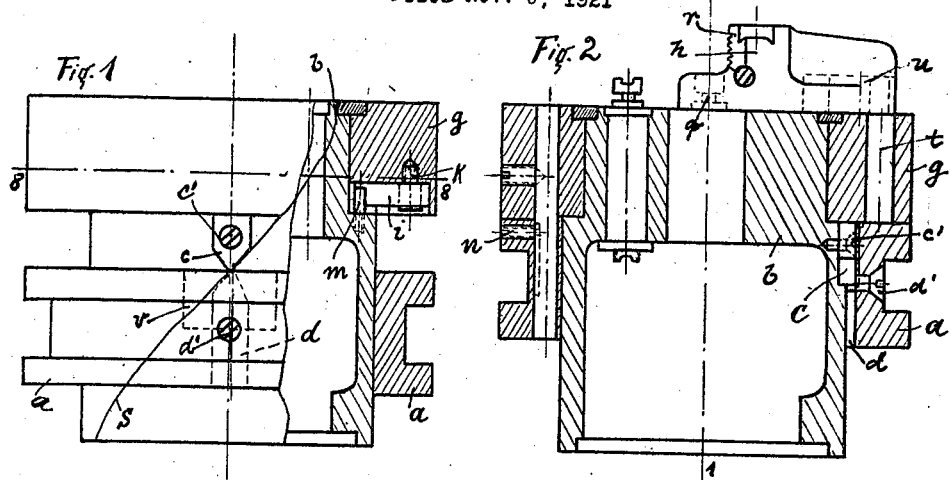

1,457,268

UNITED STATES PATENT OFFICE.

RUDOLF REINERY, OF KABEL, GERMANY.

AUTOMATIC CHUCK.

Application filed November 5, 1921. Serial No. 513,199.

*To all whom it may concern:*

Be it known that I, RUDOLF REINERY, a citizen of the German Republic, and a resident of Kabel i. W., Germany, have invented certain new and useful Improvements in Automatic Chucks, of which the following is a description.

My invention relates to self-opening screwing chucks and more particularly to chucks of the kind described in which the chasers are secured to rocking holders. Chucks of this general description are known in the art of cutting metal and various means are employed for the automatic opening of the same. Generally, this is effected by a ring rotatably carried on the body of the chuck to which rotation is imparted by means, such as conical pins, wedges, cams, etc. The said means are in contact with each other only along a line or a very narrow surface and, besides, the cooperating parts do not move at the same velocity. Consequently, they will wear excessively and the life of such chucks, particularly of the larger sizes, will be very short.

I overcome this drawback by forming the contact surfaces of dogs secured to the head and operating ring of the chucks in the shape of steep helical faces. The ring and head are connected by pins, so that they will rotate in unison. The head which causes the holders of the chasers to rock, is free to rotate on the chuck body to a limited extent. An axial displacement of the ring in relation to the head of the chuck causes the said dogs to engage so that the head is rotated on the body of the chuck by the helical faces of the dogs sliding along each other. This construction of the dogs effects a very smooth operation of the chuck which is very accurate and practically without wear. The chuck is opened by means of U-shaped springs. The chuck is of very simple yet very effective design.

In the drawings accompanying this specification, a chuck embodying my invention is illustrated by way of example. In the drawings, Fig. 1 is an elevation, partly in section on line 1—1 of Fig. 3, of my improved chuck, Fig. 2 is a section on line 2—2 of Fig. 3, Fig. 3 is a front end view of the chuck, Figs. 4, 5 and 6 illustrate various positions of the dogs for operating the head of the chuck, Fig. 7 is an end view of two cooperating dogs, Figs. 8 and 9 are sections, on a larger scale, on line 8—8 of Fig. 1 and line 1—1 of Fig. 5, respectively.

$a$ is the operating ring which is free to slide on but partakes in the rotation of, the body $b$ of the chuck. The front end of the body is of smaller diameter than the rest of the body and forms a bearing for a head $g$ which is connected with the ring $a$ by pins $f$. The head is free to rotate on the body $b$ but is held against axial movement. A dog $c$ is secured to the body $b$ by a screw $c'$ and a corresponding dog $d$ is secured to the ring $a$ by a screw $d'$. The faces of said dogs are curved on a helical line $s$, as indicated in Figs. 1 and 4. The inner surface of the ring $a$ is recessed at $v$ to either side of the dog $d$. I may provide any number of such cooperating dogs on a chuck.

The chasers $r$ are secured to holders $h$ one of which is shown in Fig. 3. The holders $h$ are pivotally carried on the body $b$ by pins $q$. Slotted guides $u$ are formed in their free ends which are engaged by cross heads secured on pins $t$ in the head $g$.

U-shaped springs $i$ are arranged in recesses of the head $g$ in which they are held by pins $k$. Facing the ends of said springs are pins $m$ and $m'$ secured to the body $b$.

In the position of the ring $a$ illustrated in Fig. 1, the chuck is open. In order to close it, that is, to move the chasers forward into their operative position, the ring $a$ is displaced axially on the body $b$ until it engages the head $g$. During this movement of the ring $a$, the dog $d$, which advances with the ring, is pushed to the right in Fig. 1 by the dog $c$. Fig. 5 shows the initial position of the dogs before the ring $a$ is displaced, Fig. 4 is an intermediate position and Fig. 6 the final position of the dogs when the ring $a$ is engaging the ring $g$. As the dog $c$ is fixed on the body $b$, the ring $a$ will be rotated while it is being displaced axially and the head $g$ will be rotated with it by the pins $f$. This causes the holders $h$ to rock and to advance the chasers $r$. Suppose the head $g$ to have been rotated in the direction of the arrow in Fig. 8. The spring $i$ which moves with the head $g$, will finally engage the pin $m$ so that it will be bent on further rotation as illustrated, while the opposite end of the spring engages the opposite wall $j^2$ of its recess.

In order to open the chuck, the ring $a$ is withdrawn and returned into the position illustrated in Fig. 1. The pressure of the spring or springs $i$ will then cause the head $g$ to rotate in opposite direction. The ring $a$ will rotate with the head until the parts are in the initial position of Fig. 1.

If it be desired that the ring $a$ and head $g$ should rotate in the opposite direction, that is, for instance, to the left in Fig. 1, a set screw $n$ engaging a groove in one of the pins $f$, is withdrawn and the ring $a$ is rotated until the dog $d$ is at the left of the dog $c$ in Fig. 1 whereupon the screw $n$ is tightened. When the ring $a$ is now displaced, it will rotate to the left in Fig. 1 and the other pin, $m'$, will engage the end of the spring $i$ so that its opposite end will engage the wall $j'$ of its recess.

I wish it to be understood that I do not desire to be limited to the exact details of construction shown and described, as my invention may be modified in various ways without departing from its essential features.

I claim:

1. In a self opening chuck, in combination, a body, chaser holders pivoted to said body, a head adapted to rotate on said body and operatively connected with said chaser holders, a dog secured on said body and a dog operatively connected with said head and adapted to cooperate with said dog on said body, the operating faces of said dogs being formed on helical curves.

2. In a self opening chuck, in combination, a body, chaser holders pivoted to said body, a head adapted to rotate on said body and operatively connected with said chaser holders, means for rotating said head, a spring secured to said head and a pin secured to said body and adapted to be engaged by said spring when the head is rotated in a given direction.

In testimony whereof I affix my signature.

RUDOLF REINERY.